United States Patent [19]

Martens

[11] Patent Number: 4,782,331
[45] Date of Patent: Nov. 1, 1988

[54] PHOTOELECTRIC ICING DETECTOR

[75] Inventor: Gerd H. Martens, Hamburg, Fed. Rep. of Germany

[73] Assignee: U.S. Philips Corporation, New York, N.Y.

[21] Appl. No.: 61,231

[22] Filed: Jun. 10, 1987

[30] Foreign Application Priority Data

Jun. 10, 1986 [DE] Fed. Rep. of Germany ....... 3619538

[51] Int. Cl.$^4$ ............................................. G08B 21/00
[52] U.S. Cl. ..................................... 340/583; 340/580
[58] Field of Search ................................ 340/583, 580

[56] References Cited

U.S. PATENT DOCUMENTS 2,359,787  10/1944  Peters et al. ........................ 340/583
3,045,223   7/1962  Kapany et al. ...................... 340/583
4,583,064   8/1985  Kovacs ................................ 340/583

Primary Examiner—Glen R. Swann, III
Attorney, Agent, or Firm—F. Brice Faller

[57] ABSTRACT

An arrangement for the detection of icing on the surface of an object includes an optical conductor in which the radiation from a source strikes at least one plane of the conductor, which is located in the area of the surface to be tested and which is accessible from outside the object, and a detector which receive the radiation coming from this conductor plane and converts it into an electrical signal. An evaluation device compares the signal which a threshold value and, depending on the result of the comparison, generates an alarm signal.

5 Claims, 1 Drawing Sheet

PHOTOELECTRIC ICING DETECTOR

BACKGROUND OF THE INVENTION

The invention relates to an arrangement for the detection of icing on the surface of an object.

Icing represents a great problem, particularly in the case of planes, for it can influence the flight characteristics and the weight of the aircraft so severely that the airworthiness is impaired and a crash can occur. When icing on aircraft is detected before take-off it can be removed by appropriate treatment prior to departure, whereas at the onset of icing during flight the pilot must take immediate counter-measures and, in particular, must choose a different flight altitude. In both cases, it is important to be able to detect icing promptly and reliably.

SUMMARY OF THE INVENTION

The arrangement for the detection of icing on the surface of an object automatically generates an alarm signal when a given thickness of the icing layer is exceeded.

This object is achieved by a source for the generation of optical radiation and an optical conductor, in which the radiation from the source strikes at least one plane of a conductor located in the area of the surface to be tested and which is accessible from outside the object. A detector receives the radiation coming from this conductor plane and converts it into an electrical signal, and an evaluation device compares the signal with a threshold value and, depending on the result of the comparison, generates an alarm signal.

The invention is based on the idea that the reflection or the refraction at the surface of the optical conductor is changed when this is covered with ice, so that by means of the radiation coming from the plane of the conductor the presence of icing, and under certain conditions also the extent of the icing, can be determined.

The changed reflection or refraction at the surface of the optical conductor can be utilised in various ways. Radiation from inside the optical conductor may strike the plane of the conductor and the detector may receive the reflected radiation. In this case the radiation is essentially input into the optical conductor reflection-free in such a way that it strikes the plane of the conductor from inside and is reflected.

The shape of the optical conductor can be chosen almost arbitrarily; it may have the shape of a prism, the faces of which project from the surface of the object. The radiation from the source is essentially directed as a parallel beam on to a face of the prism and the detector receives reflected radiation from the opposite face of the prism. A prism of this kind, for example made of quartz glass, can be easily manufactured. In addition, it is particularly advantageous for the prism to form an angle of about 90° between the faces and for the beam to be essentially parallel to the angle bisectors towards which one face of the prism is directed. In this way, when there is no icing the reflected radiation re-emerges from the base of the prism in parallel with the optical radiation from the source, resulting in a simple construction. A simple design of the prism further consists in the fact that the prism is a cone. This shape can be manufactured particularly easily.

The optical conductor may have an elongated profiled body, at least one part of the profiled plane of which forms the plane of the conductor. The radiation from the source is directed towards the plane of the conductor in an essentially parallel beam at a flat angle, such that in the case of air as the medium total reflection occurs immediately outside the conductor. The flat angle is advantageously chosen in such a way that when the optical conductor is covered with ice the total reflection is practically eliminated, so that at the point at which the radiation emerges when the optical conductor is not covered, practically no more radiation emerges when it is covered with ice.

Another embodiment of the invention, on the other hand, is characterised in that the radiation from outside the optical conductor strikes the plane of the conductor and the detector receives the radiation penetrating the optical conductor. The plane of the conductor can be designed in such a way that in the absence of ice formation only a slight reflection of the incident radiation from outside takes place. However, when a layer of ice forms this changes into a multiple reflection inside the layer of ice and thus leads to considerable losses, so that the radiation penetrating the optical conductor is greatly attenuated when there is a covering of ice.

For a favourable mechanical design of the total arrangement it is advantageous for the source of optical radiation and the detector to be connected to the optical conductor via optical fibers. In this way the source of optical radiation and the evaluation device can be set up relatively far away from the prism at an appropriate point.

The wavelength of the optical radiation can likewise be chosen within wide limits. It is, however, advantageous for the optical radiation to be IR radiation close to the visible range. Inexpensive components are available for such a range of the optical radiation and the danger of distortion of the measuring signal is only slight.

DETAILED DESCRIPTION OF THE PREFERRED EMBODIMENTS

Figures 1A, 1B, 1C, 1D:
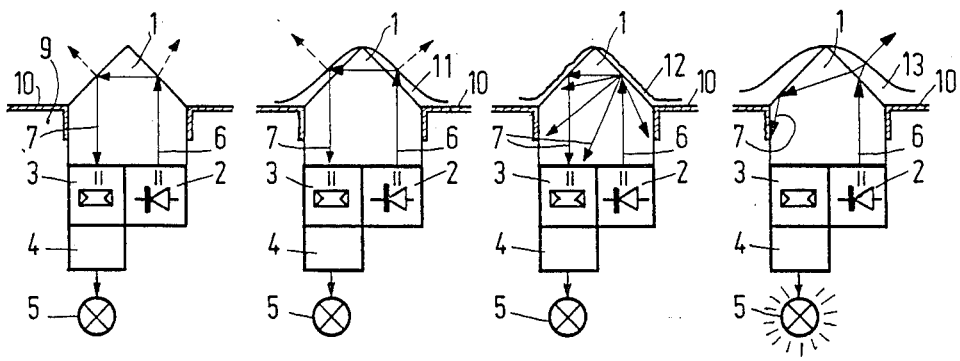
FIGS. 1a to d show the course of the radiation in a prism with varying covering.

FIG. 1 shows an arrangement with a prism projecting from the surface 10 of an object 9 to be tested for icing under four different operating conditions. In FIG. 1a the surface of the prism is free, so that the essentially parallel beam 6 of optical radiation emitted from the source 2 strikes one face of the prism. Let us assume here that the top angle of the prism is 90° and the beam 6 of optical radiation travels parallel to the angle bisectors, so that the reflecting beam 7 likewise re-emerges parallel to it from the prism 1. A detector 3 is positioned at the exit side which converts the radiation received into an electrical signal and supplies this to an evaluation device 4 which, for example, contains a normal comparator, which compares the detector signal with a fixed preset signal. This signal can also be derived from the radiation generated by the radiation source 2 in order to take account of differences in the radiation from source 2 which are due to manufacturing tolerances or aging. The evaluation device 4 generates an alarm signal which, for example, is supplied to a signal lamp 5. When the beam 7 has a sufficient intensity, which on the basis of refraction and scattering at the surfaces of the prism 1 is lower than that of the beam 6 from the source 2, no alarm signal is generated.

In FIG. 1b it is assumed that the surface of the prism 1 is covered with a layer of water 11, for example, as a result of rain. In principle, a layer of water such as this covers the surface evenly so that when the beam 6 emerges from the prism 1 and penetrates into the layer of water it is in principle reflected at its surface in the same direction as in the case of a dry prism, so that in principle the reflected beam 7 emerges in the same direction as in the case of a dry prism, in which respect only the intensity may be slightly reduced as a result of the multiple refraction and scattering, if any. Account can be taken of this by adjusting the threshold value in the evaluation device 4, so that under these circumstances no alarm signal is generated as yet.

In FIG. 1c it is assumed that the surface of the prism 1 is covered with a layer of white frost. In so far as a significant part of the beam 6 is not reflected from the surface of the prism 1 here, but is refracted in the layer of white frost, the reflected and scattered radiation 7 striking the detector is still sufficient to prevent the generation of an alarm signal if the threshold value in the evaluation device 4 is adjusted correspondingly.

Finally, in FIG. 1d it is assumed that the prism 1 is covered with a layer of ice 13. This layer of ice 13, however, is no longer even, so that the beam 6 from the surface of the ice layer is no longer reflected in the original direction but at an angle to it, and the reflected radiation 7 then no longer strikes the dectector 3. The latter thus emits a significantly smaller electrical signal than in the case of the other conditions, in which respect this signal now lies below the threshold set in the evaluation device, so that the latter generates an alarm signal and causes the lamp 5 to light up. As a result, icing of the surface of the object 10 is reliably indicated.

Figure 2:
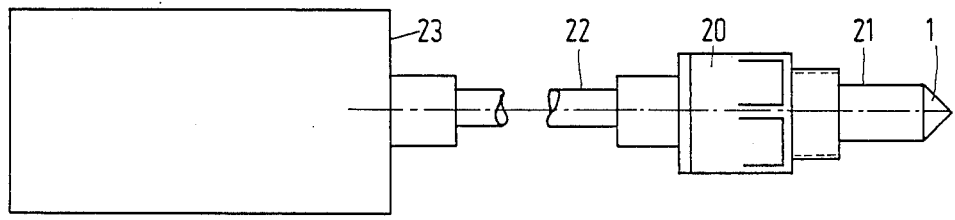
FIG. 2 shows an arrangement with a connection via optical fibers between the prism and evaluation device with the radiation source.

FIG. 2 shows an arrangement in which a cone-shaped prism 1 forms the end of a round rod 21, for example made of glass, with a diameter of, for example, 10 mm which is fixed in a holder 20, which is fitted, for example, screwed into a corresponding counterpart under the surface of an object. To the bottom of the glass rod 21 is fitted an optical fiber 22, the other end of which leads into a housing 23, which contains the source 2 for optical radiation as well as the detector 3 and the evaluation device 4. Since the losses in the optical fiber 22 are only slight, this can be relatively long, so that the housing 23 can be set up far away from the prism 1. The otpical fiber 22 is used as a go-and-return conductor here, in which respect the radiations in both directions, particularly in the housing 23, can again be separated in the known way. Instead of this, of course, two parallel optical fibers, each for one direction of the optical radiation, can also be used.

Figure 3:
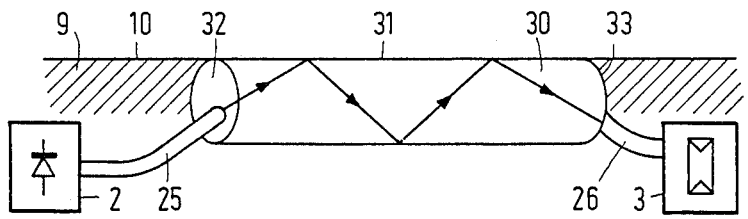
FIG. 3 shows the execution of the optical conductor with total reflection.

In the embodiment according to FIG. 3 the optical conductor is an elongated profiled body 30, one of the surfaces 31 of which is flush with the surface 10 of an object 9 to be tested for icing, so that to a great extent a smooth plane is created. Obviously, the profiled body 30 can, however, also project from the surface 10 or be located directly in front of it.

The optical radiation generated by the source 2 is supplied via an optical fiber 25 to one end plane 32 of the profiled body 30 in such a way that the radiation enters as an almost parallel beam in a flat angle to the axis of the profiled body and also strikes the outside surface 31 at this angle. This can also happen, for example, as a result of the fact that the end plane 32 is inclined at a corresponding angle to the axis of the profiled body 30.

The radiation is completely reflected at the plane 31 and directed to the opposite plane of the profiled body 30, and after several total reflections at the plane 31 and the opposite plane the radiation finally emerges at the end plane 33 of the profiled body 30 and enters a further optical fiber 26, which conducts the emerging radiation to the detector 3. The elements following the detector 3 have been omitted here.

When the plane 31 is covered with a layer of ice, the radiation is no longer totally reflected on this plane, and it emerges from the optical conductor, so that at the end plane 33 of the optical conductor 30 no radiation, or only a little radiation, now strikes the optical fiber 26. Even if the beam were reflected on the outside surface of the layer of ice, the path of the radiation through the optical conductor 30 would be so greatly changed—and in fact increasingly changed as more and more reflections occur between the two opposite planes—that radiation emerging at the end plane 33 would not emerge at the point at which the optical fiber 26 is fitted. In any case, when the surface 31 of the optical conductor 30 is covered with ice the detector 3 receives significantly less radiation, as a result of which an alarm signal can be derived in the manner already described.

The profiled body 30 need not be a round rod but can take various forms, and in particular the shape of the plane opposite plane 31 can also be flat.

Figure 4:
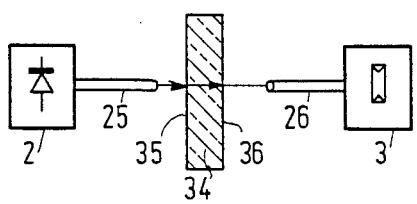
FIG. 4 shows an arrangement in which the optical radiation strikes the plane of the conductor from outside.

FIG. 4 shows an arrangement in which the optical radiation from outside strikes the optical conductor 34, and does this on the surface 35 on which ice may form. The optical radiation is again generated by a source 2 and conducted via an optical fiber which ends in such a way in front of the optical conductor that between the end of the optical fiber 25 and the surface 35 there is a free section. The optical conductor 34 is here designed as a plate, the surface 35 of which is essentially perpendicular to the angle of incidence of the radiation. With a corresponding design and/or treatment of the surface 35, the incident radiation largely enters the optical conductor 34 and similarly emerges largely undisturbed at the opposite surface 36, in so far as no layer of ice is present. The emerging radiation is intercepted by the optical fiber 26 and supplied to the detector 3.

When the surface 35 is covered with ice and, if applicable, the surface 26 as well, the incident beam is partly reflected on the surface of the layer of ice and partly repeatedly reflected inside the layer of ice, so that only a part of the radiation emitted by the optical fiber 25 can penetrate into the optical conductor 34. The same effect then again occurs at the surface 36, when this is likewise freely accessible, so that a layer of ice can form there too. As a result, in the event of icing the optical fiber 26 receives an at least significantly reduced quantity of radiation which can be evaluated by the detector 3 and the following circuits which are not shown here.

I claim:
1. An arrangement for the detection of icing on the surface of an object comprising a source for generating a parallel beam of optical radiation, an optical conductor in the shape of a prism and having two faces which project above the surface on which icing is to be detected, said radiation beam striking one of said faces from inside the conductor, a detector which receives radiation reflected from both of said faces and converts it into an electrical signal, an evaluation device which compares the signal with a threshold value and, depending on the result of the comparison, generates an alarm signal.

2. An arrangement as in claim 1 wherein the prism forms an angle of about 90° between the faces and the beam is essentially parallel to the angle bisector.

3. An arrangement as in claim 1 wherein the prism is in the shape of a cone.

4. An arrangement as in claim 1 wherein the source of optical radiation and the detector are connected to the optical conductor via optical fibers.

5. An arrangement as in claim 1 wherein the optical radiation is infrared radiation close to the visible range.

* * * * *